(12) United States Patent
Thompson (10) Patent No.: US 7,170,002 B2
(45) Date of Patent: Jan. 30, 2007

(54) CONDUIT JUNCTION WITH INTERNAL EARTH

(76) Inventor: Richard John Thompson, 7 Holywood, Wolsingham, Bishop Auckland, Co Durham, DL 13 3HE (GB)

( * ) Notice: Subject to any disclaimer, the term of this patent is extended or adjusted under 35 U.S.C. 154(b) by 0 days.

(21) Appl. No.: 10/534,904

(22) PCT Filed: Dec. 11, 2003

(86) PCT No.: PCT/GB03/05420

§ 371 (c)(1),
(2), (4) Date: Sep. 26, 2005

(87) PCT Pub. No.: WO2004/055952

PCT Pub. Date: Jul. 1, 2004

(65) Prior Publication Data

US 2006/0124335 A1    Jun. 15, 2006

(30) Foreign Application Priority Data

Dec. 13, 2002   (GB)  ................................ 0229218.3

(51) Int. Cl.
*H05K 5/02* (2006.01)

(52) U.S. Cl. .......................... 174/51; 174/6; 174/35 C; 174/40 CC; 174/135; 439/98; 439/92

(58) Field of Classification Search .................. 174/51, 174/59, 60, 6, 35 C, 135, 40 CC; 439/98, 439/92, 100; 361/799, 753
See application file for complete search history.

(56) References Cited

U.S. PATENT DOCUMENTS

| 5,541,363 A | 7/1996 | Weiss et al. .................. 174/50 |
| 5,621,189 A * | 4/1997 | Dodds ........................... 174/50 |
| 6,011,218 A * | 1/2000 | Burek et al. ............ 174/40 CC |

FOREIGN PATENT DOCUMENTS

GB          1 159 264          7/1969

* cited by examiner

*Primary Examiner*—Dhiru R. Patel
(74) *Attorney, Agent, or Firm*—Jack Schwartz (57) ABSTRACT

A junction for joining a first section of conduit to a second section of conduit is described. The junction has a body, which has a first connecting portion for connecting a respective first section of conduit to said body and has a second connecting portion for connecting a second respective section of conduit to said body. The body defines a volume extending between the first connecting portion and the second connecting portion. The junction also has a lid which is engagable with the body and is adapted to close the aperture. The junction also has at least one earth connector which is located within the body and has at least one channel adapted to receive at least one earthed electrical cable in electrical contact with the body.

9 Claims, 8 Drawing Sheets

FIG. 1

PRIOR ART

CONDUIT JUNCTION WITH INTERNAL EARTH

BACKGROUND OF THE INVENTION

The present invention relates to a junction having an internal earth and for joining sections of conduits and particularly, but not exclusively, to such junctions for use in environments where hygiene is important.

Figure 1:
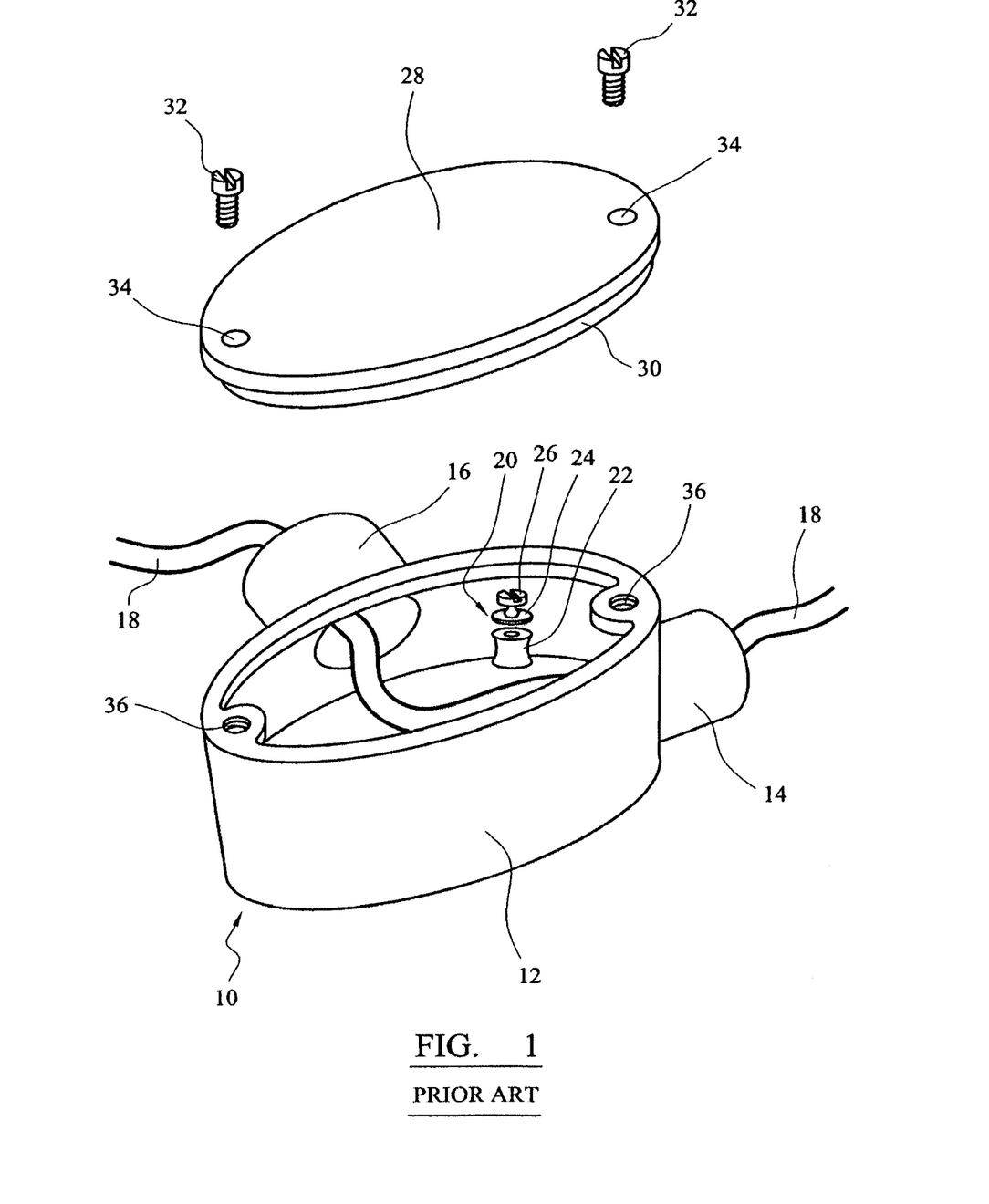
FIG. 1 is a perspective view of a conduit junction of the prior art.

FIG. 1 shows an example of a metal junction used for connecting lengths of conduit also of metal. The conduit used with this junction are of circular cross section and are not shown in this figure. The junction 10 has a body 12 having first and second connecting portions 14 and 16 for connecting sections of conduit to the junction 12. In use, a cable 18 is inserted along the conduit sections and through connecting portions 14 and 16. A further cable, being an earth cable, (not shown) is also passed through body 12 and is attached in electrical contact with an earthed connecting means 20 which is formed from a base portion 22 which has a threaded aperture, a washer 24 and a fixing screw 26. Typically a short length of the plastic protective coating which surrounds the earth cable is removed and the cable is wrapped around screw 26 and fixed into position. Once all of the cables are in position lid 28, with sealing gasket 30, is located on body 12 and screws 32 are inserted through unthreaded holes 34 and into threaded holes 36 so as to fix lid 28 to body 12.

This type of junction is not at all compact and being circular in shape takes up a considerable volume when placed next to other objects. For example, if placed in a corner between two connecting walls and a ceiling, significant spaces are left between the junction and the walls. These spaces attract dirt and prove difficult to clean, and therefore in industries where hygiene is of paramount importance such a junction would prove unsuitable for this type of location.

Figure 2:
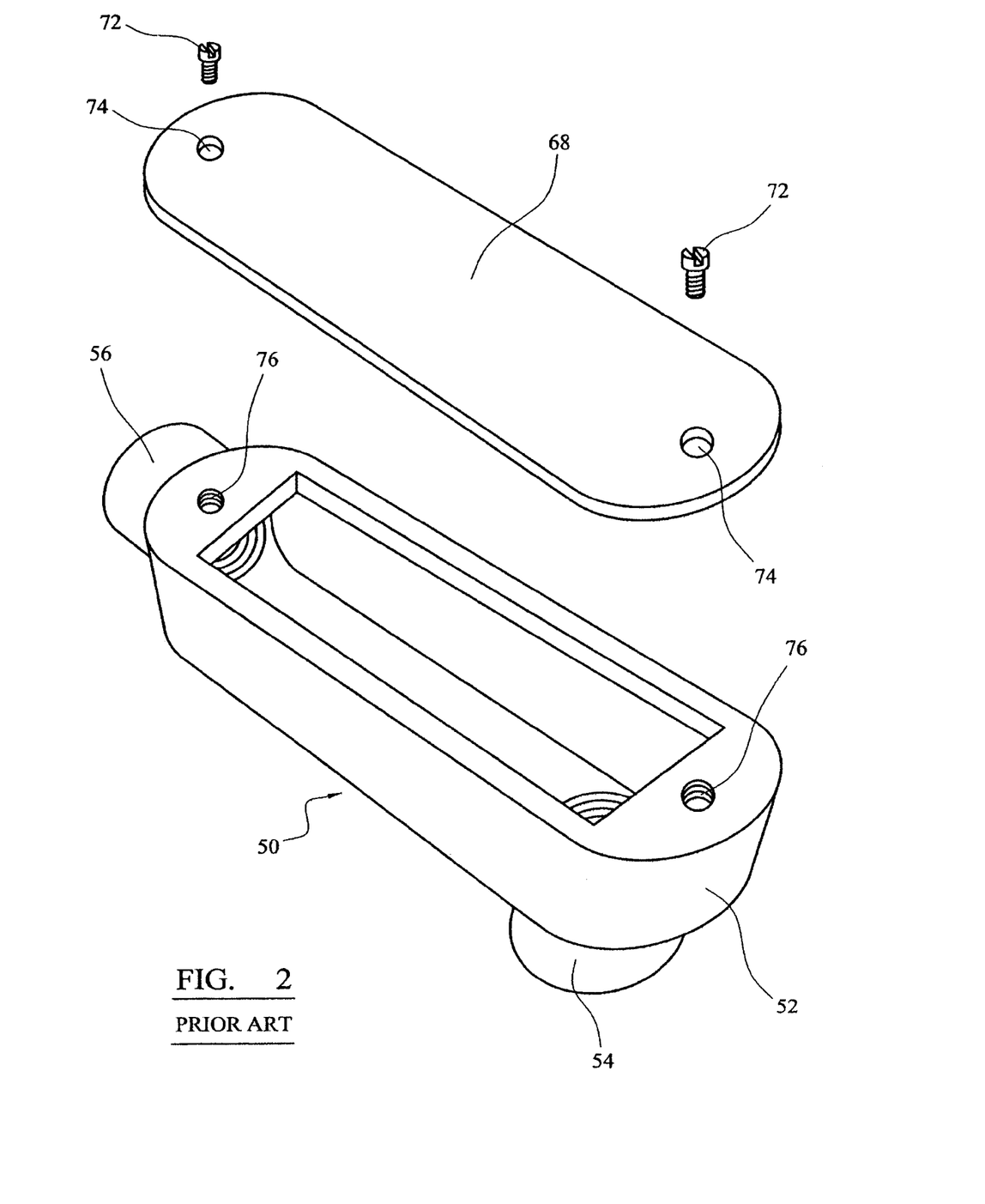
FIG. 2 is a perspective view of another conduit junction of the prior art.

An alternative junction 50 is shown in FIG. 2. This junction 50 has a body 52 having connection portions 54 and 56. The junction 50 also has a lid 68 which is attached to body 52 by screws 72 passing through unthreaded holes 74 and into threaded holes 76. This form of junction is preferred in some industries due to its more compact dimensions. Specifically the junction is typically around twice as thick and tall as the diameter of the cross section of the conduit it joins. However, it maintains a large internal volume by having a greater length than the junction 10 of FIG. 1. However, it is not possible to provide the junction 50, used in the junction of FIG. 2, with an internal earthing connection, such as that shown in FIG. 1, since this would obstruct the cables in body 52 and may prevent them from passing through junction 50 as they are fed through the adjoining conduit sections. As a result, external earthing systems are used where an earthed wire extends externally along the path of the conduit sections and is occasionally clamped using external clamping means to the outside of the conduit sections.

In many industries such an arrangement is satisfactory, if somewhat unattractive. However, as previously mentioned, in some industries hygiene is of importance. For example, in the food, beverage or pharmaceutical industries it can be important that the external surfaces of any conduit system are easy to clean. These conduit systems can be made from stainless steel and as many surfaces as possible are smooth and easy to clean. As a result, an externally clamped earthed wire would be unsuitable as this would create a significant number of dirt traps and prove difficult to clean.

The present invention seek to overcome disadvantages of prior junctions.

SUMMARY OF THE INVENTION

The present invention provides a junction for joining a first conduit to a second conduit. The junction can comprise a body having a first connecting portion and a second connecting portion. The first connecting portion can be for connecting said first conduit to said body. Said second connecting portion can be for connecting said second conduit to said body. The body can define a volume extending between said first connecting portion and said second connecting portion. The body can include an aperture allowing access to said volume. The junction can also include a lid adapted to close the aperture. The junction can also include an earth connector located within said body and having a channel adapted to receive an earthed electrical cable in electrical contact with said body.

Said connecting portions may be a threaded aperture adapted to receive a respective conduit section of substantially circular cross-section.

In an embodiment, said channel can be tubular.

In another embodiment, an upper portion of a cross-section of said channel can be open.

In an embodiment said channel can have at least one access aperture.

In another embodiment, said channel can have a first access aperture and a second access aperture, said apertures being connected by said channel.

[The channel between said first and second access apertures may be substantially linear.

Alternatively, the channel between said first and second access apertures may be substantially U-shaped.]

In an embodiment, said electrical contact with said body can be maintained by cable retaining means.

The cable retaining means may comprise at least one screw adapted to be received in a respective threaded portion of at least one side of a respective said channel.

Alternatively, the cable retaining means may comprise at least one clamping means adapted to engage said earth cable and press it into contact with said body.

In one embodiment, said body can be cast.

In another embodiment, said earth connecting means can be cast as a part of said body.

BRIEF DESCRIPTION OF THE DRAWINGS

Preferred embodiments of the present invention will now be described, by way of example only, and not in any limitative sense, with reference to the accompanying drawings, in which.

DETAILED DESCRIPTION

Figures 3, 4:
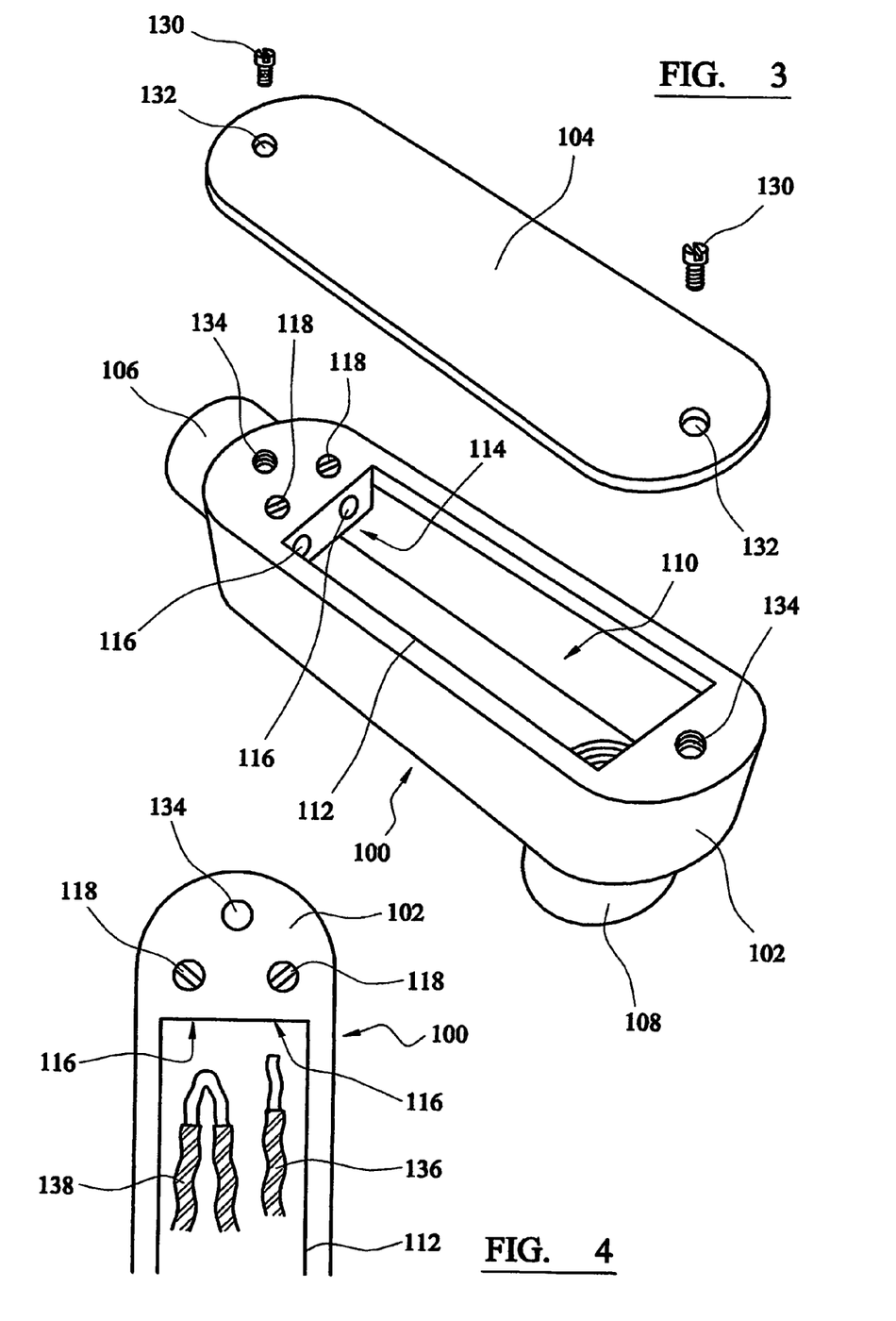
FIG. 3 is a perspective view of an embodiment of the present invention.
FIG. 4 is a plan view of the embodiment of FIG. 3.

Referring to FIGS. 3 and 4, a junction 100, for connecting a first section of conduit (not shown) to a second section of conduit (also not shown), has a body 102 and lid 104. Body 102 has a first connecting portion 106 and a second connecting portion 108 and defines a volume 110 between said first and second connecting portions 106 and 108. Body 102 also has an aperture 112 which is covered by lid 104, which has a gasket seal (not shown). The junction is also provided with a pair of earth connecting means 114 which are formed from channels 116 and engaging means 118 in the form of grub screws. Lid 104 is maintained in position on body 102 by use of screws 130 which in use extend through unthreaded holes 132 and into threaded holes 134. FIG. 4 also shows wires 136 and 138 which in use are inserted into channels 116.

In use electrical cables are fed through conduit sections which are attached to junction 100 at first and second connecting portions 106 and 108. These cables include at least one earthed cable 136, 138. In this embodiment a single cable, as shown at 138, may be used where short section of the cable casing can be removed and the cable bent and inserted into channel 116 before grub screws 118 are used to retain cable 138 in position and in electrical contact with body 102. This single cable extending throughout the network of conduit sections provided the most effective earthing means since the smaller the number of breaks and connections in a cable the lower the resistance within the cable and therefore the more effective the earthing will be.

By providing a conduit junction with an internal earth connection in the form of a channel adapted to receive one or more earthed cables, the advantage is provided that a slim junction, generally having a width around twice the diameter of the conduit sections, can be provided with an internal earthed connection. By using a channel it is possible to include an earth connecting means without creating an obstruction to the movement of the other cables as they are inserted into the junction. Furthermore, the earthed connection can be located within the junction very close to the path that the earthed cable would naturally be following. As a result it is not necessary to use an excess of earthed cable and the cable does not take up the limited space within the junction.

An alternative example would be that of cable 136 which has been cut and is also inserted into channel 116 and retained in position and electrical contact by grub screw 118. A second single cable (not shown) would then be inserted into the other channel 116 and similarly retained by grub screw 118, and would extend through the conduit section to the next junction.

Figures 5, 6:
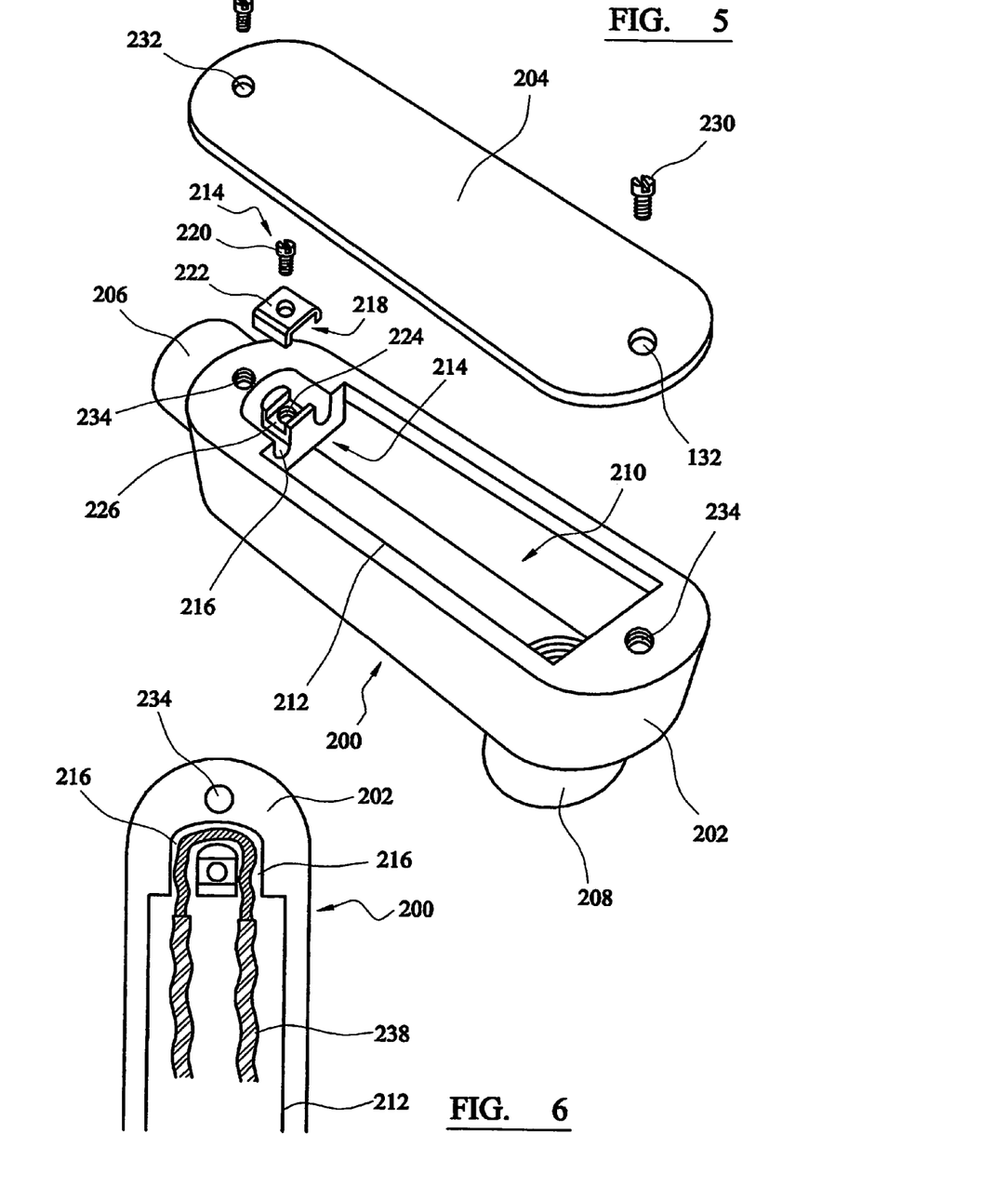
FIG. 5 is a perspective view of another embodiment of the present invention.
FIG. 6 is a plan view of the embodiment of FIG. 5.

Referring to FIGS. 5 and 6, in which parts common with the embodiment of FIGS. 3 and 4 are denoted by like reference numerals increased by 100, junction 200 has an alterative earth connecting means 214. The earth connecting means 214 is a U-shaped open channel 216 and has a retaining means 218 in the form of a cable retaining means 222 and screw 220 which is inserted into a threshold hole 224 in recessed portion 226.

In use cable 238 is located within junction 200 as previously described and has a short section of casing removed. It is then placed into channel 216, as shown in FIG. 6, and clamped into position by retaining means 222 which is held in position be screw 220 which inserted through clamping means 222 into threaded hole 224. The head of screw 220 must remain below the upper surface of body 202 and within recess 226, in order that lid 204 can be retained correctly in position.

By providing the upper portion of a cross section of said channel as open the advantage is provided that a single cable can be used as the earthing cable throughout the conduit system and can be attached in a number of conduit junctions, by simply stripping the plastic coating from a section of cable and laying the stripped section into the open channel. Thus an easy means for earthing the junction is provided making it less likely that junction will be missed out by a person installing the cables and thereby providing the most effective earth protection.

Figures 7, 8:
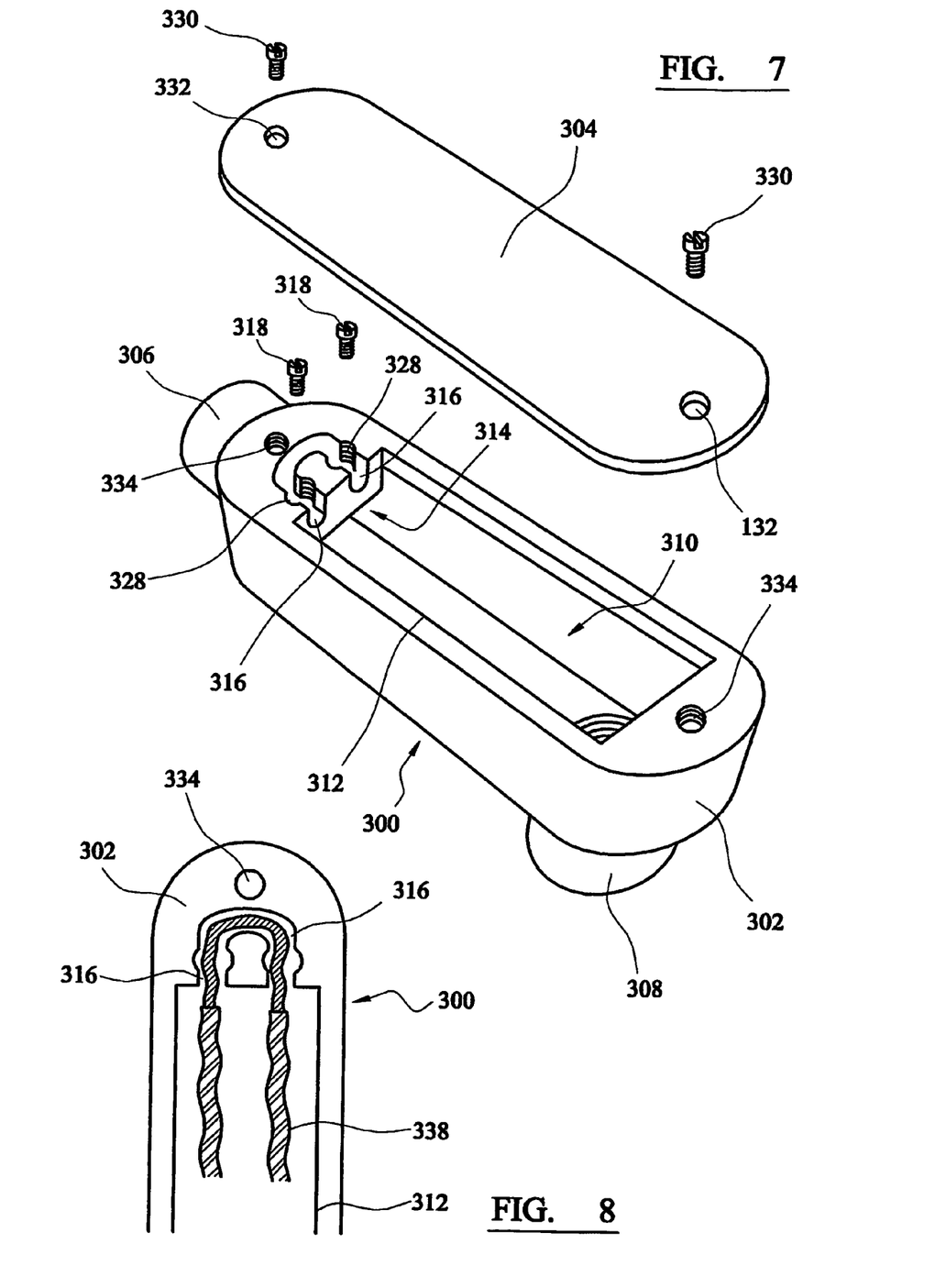
FIG. 7 is a perspective view of a further embodiment of the present invention.
FIG. 8 is a plan view of the embodiment of FIG. 7.

Referring to FIGS. 7 and 8, in which parts common with the embodiment of FIGS. 5 and 6 are denoted by like reference numerals increased by 100, body 302 of junction 300 has a U-shaped open channel 316 into which a stripped portion of an earth cable 338 is inserted and maintained in position by retaining means, in the form of grub screws, 318 which are received in threaded portions 328 of the sides of channel 316.

Figure 9:
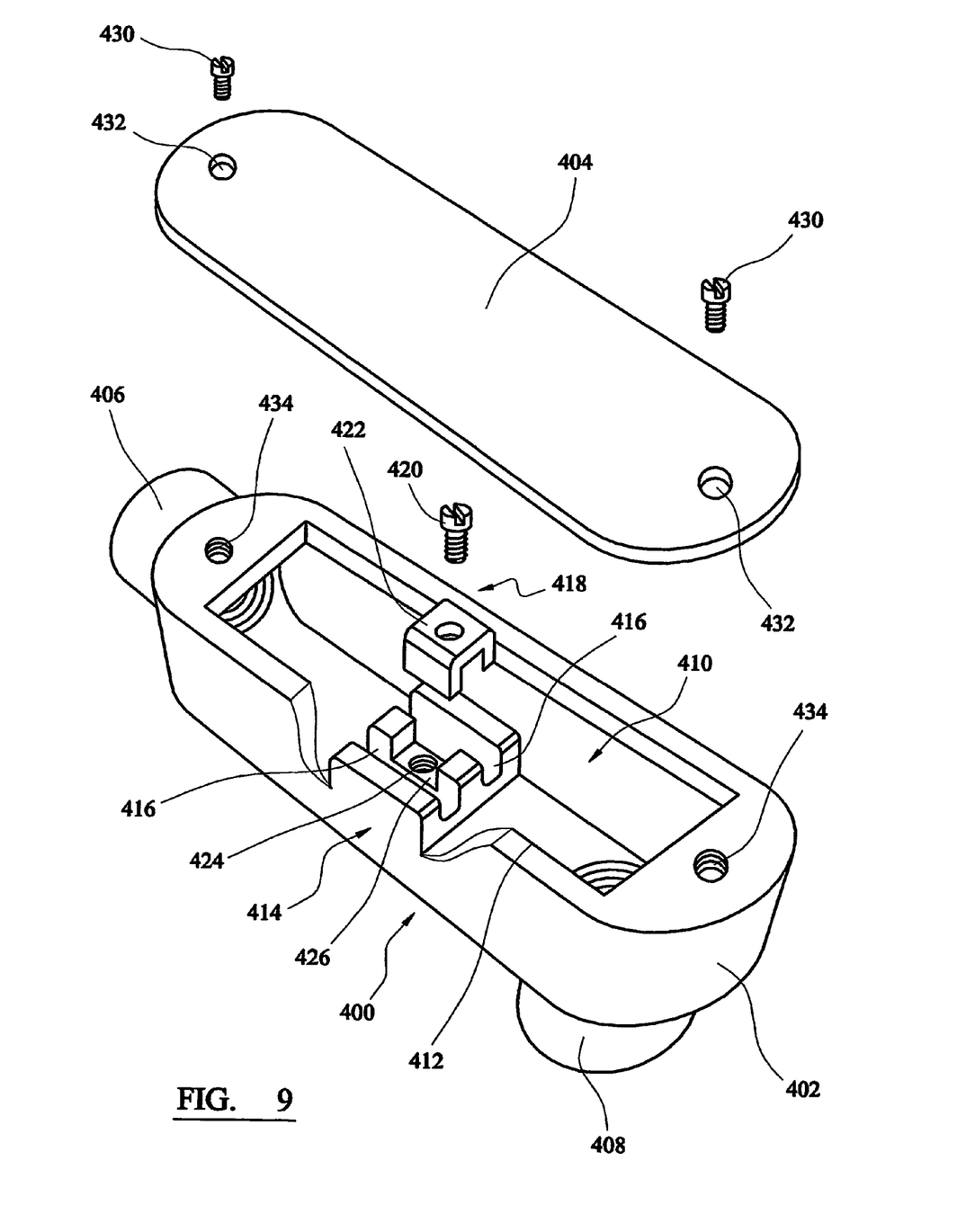
FIG. 9 is a perspective view of an embodiment of the present invention.
Figure 10:
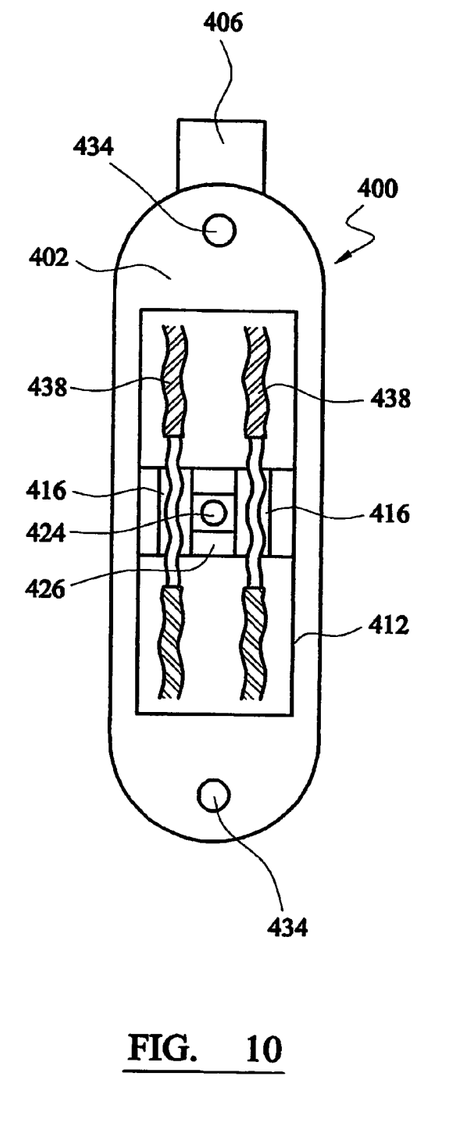
FIG. 10 is a plan view of the embodiment of FIG. 9.

Referring to FIGS. 9 and 10, in which parts common with the embodiment of FIGS. 7 and 8 are denoted by like reference numerals increased by 100, earth connecting means 414 is located on the base of body 402 and comprises to straight open channels 416 and has retaining means 428, in the form of screw 420 which attaches through clamping means 422 into hole 424 thereby holding cable 438 in electrical contact with body 402. In use, a short section of the casing of cable 438 is removed and the exposed portion of the cable placed in channel 416. The cable is then retained in electrical contact with body 402 with clamping means 422 being pressed into engagement with cable 438 by screw 420.

Figure 11:
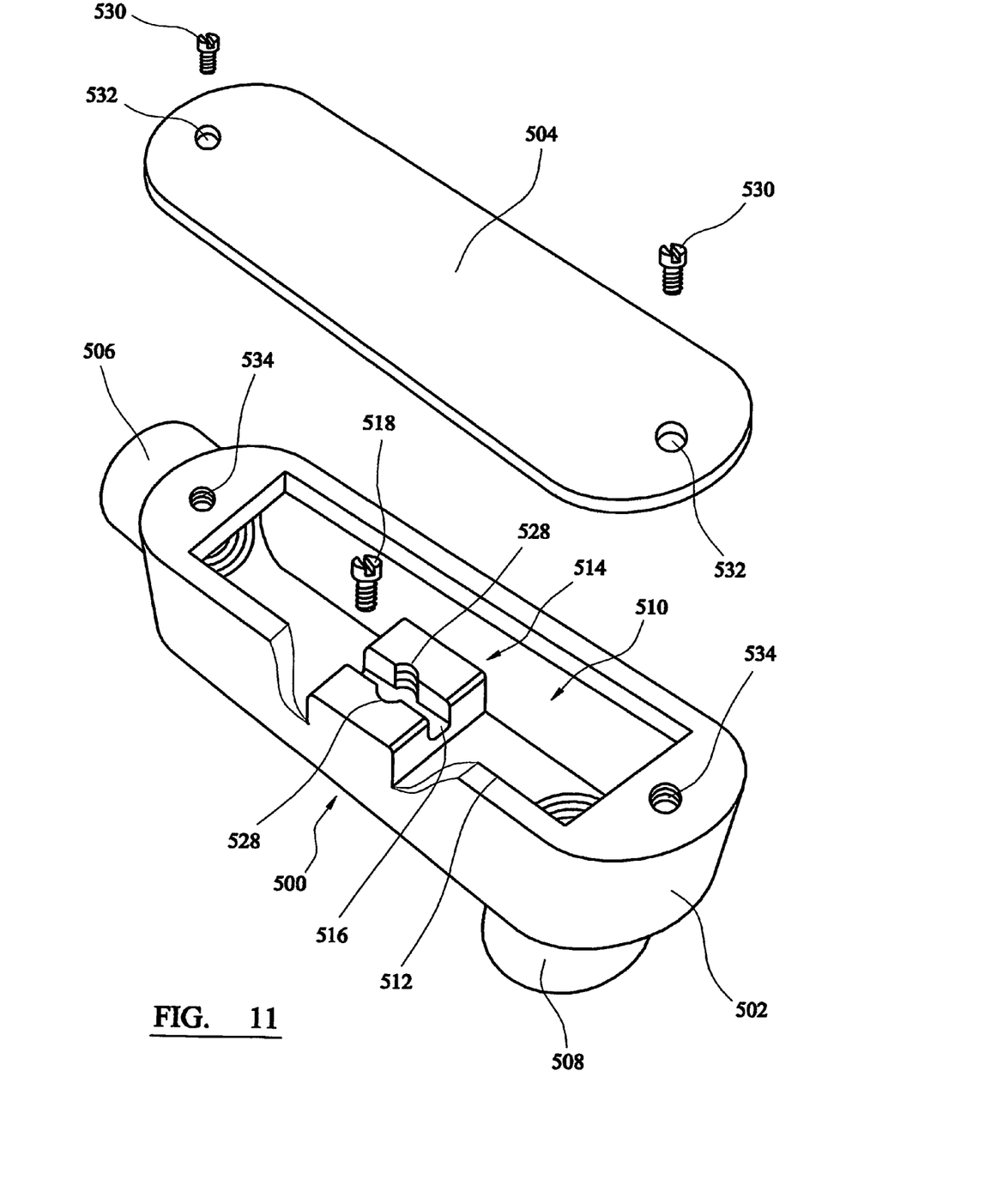
FIG. 11 is a perspective view of another embodiment of the present invention.
Figure 12:
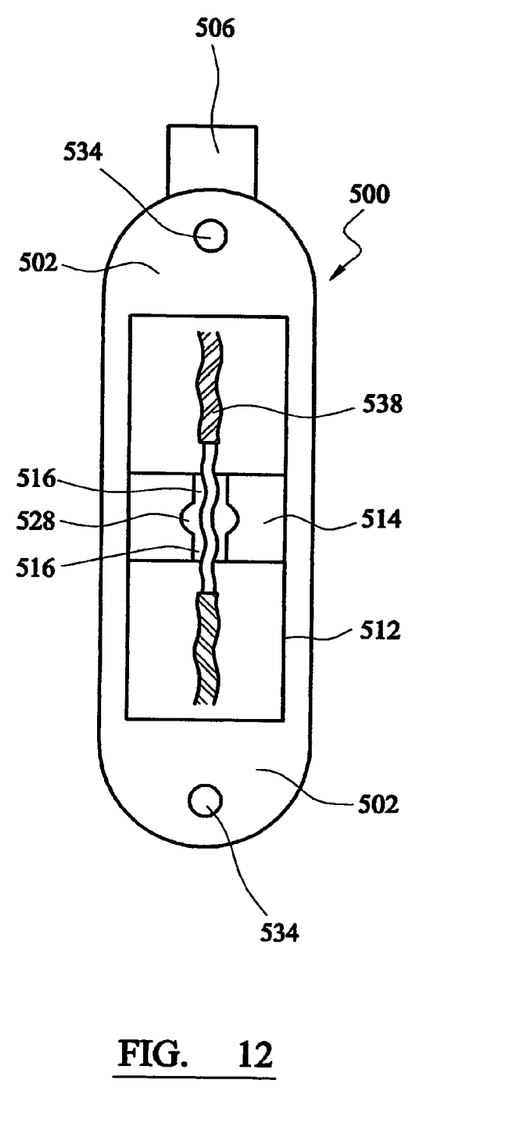
FIG. 12 is a plan view of the embodiment of FIG. 11.

Referring to FIGS. 11 and 12, in which parts common with the embodiment of FIGS. 9 and 10 are denoted by like reference numerals increased by 100. The earth connecting mean 514 is again located in the base of body 502. A single channel 516 is located therein and a grub screw 518 engages threaded portions 528 of the sides of channel 516 and clamps an exposed portion of cable 538 into electrical contact with body 502.

It would appreciated by persons skilled in the art that the above embodiments have been described by way of example only, and not in any limitative sense, and that various alterations and modifications are possible without departure from this scope of the invention as defined by the appended claims. For example, where the earth connecting means is located in the base of the body, as shown in FIGS. 9 to 12, the base of body 402 and 502 could be made thicker in order that channels 416 and 516 are recessed into the base of body 402 and 502.

What is claimed is:

1. A junction for joining at least one first section of conduit to at least one second section of conduit, the junction comprising:

a body, having at least one first connecting portion for connecting a respective first section of conduit to said body and at least one second connecting portion for connecting a second respective section of conduit to said body, the body defining a volume extending between at least one said first connecting portion and at least one second connecting portion, and having at least one aperture allowing access to said volume;

at least one lid engagable with said body and adapted to close the or each aperture; and at least one earth connector located within said body and having at least one open channel adapted to receive at least one earthed electrical cable in electrical contact with said body wherein at least one said channel is closed when at least one said lid closes the or each aperture.

2. A junction according to claim 1, wherein at least one said connecting portions is a threaded aperture adapted to receive a respective conduit section, said conduit section having a substantially circular cross-section.

3. A junction according to claim 1, wherein said channel is substantially linear.

4. A junction according to claim 1, wherein said channel is substantially U-shaped.

5. A junction according to claim 1, wherein said electrical contact with said body is maintained by a cable retainer.

6. A junction according to claim 5, wherein said cable retainer comprises:

a threaded portion of at least one side of said channel; and at least one screw adapted to be received in said threaded portion.

7. A junction according to claim 5, wherein said cable retainer comprises at least one clamp adapted to engage said earth cable and press said earth cable into contact with said body.

8. A junction according to claim 1, wherein said body is cast.

9. A junction according to claim 8, wherein said earth connector is cast as a part of said body.

* * * * *